(12) United States Patent
Lee et al.

(10) Patent No.: US 11,874,363 B2
(45) Date of Patent: *Jan. 16, 2024

(54) RADAR APPARATUS AND ANTENNA APPARATUS THEREFOR

(71) Applicant: MANDO CORPORATION, Pyeongtaek-si (KR)

(72) Inventors: Jae Eun Lee, Seoul (KR); Hae Sueng Lim, Yongin-si (KR); Seong Hee Jeong, Yongin-si (KR)

(73) Assignee: HL Klemove Corp., Incheon (KR)

( * ) Notice: Subject to any disclaimer, the term of this patent is extended or adjusted under 35 U.S.C. 154(b) by 1184 days.

This patent is subject to a terminal disclaimer.

(21) Appl. No.: 16/379,109

(22) Filed: Apr. 9, 2019

(65) Prior Publication Data

US 2019/0310358 A1  Oct. 10, 2019

(30) Foreign Application Priority Data

Apr. 9, 2018 (KR) .......................... 10-2018-0040831

(51) Int. Cl.
  *G01S 13/02* (2006.01)
  *G01S 7/41* (2006.01)
  (Continued)

(52) U.S. Cl.
  CPC ............ *G01S 13/0218* (2013.01); *G01S 7/41* (2013.01); *G01S 13/42* (2013.01); *G01S 13/86* (2013.01); *G01S 13/931* (2013.01); *H01Q 21/06* (2013.01)

(58) Field of Classification Search
  CPC ........ G01S 13/0218; G01S 7/41; G01S 13/42; G01S 13/86; G01S 13/931; G01S 7/032;
  (Continued)

(56) References Cited

U.S. PATENT DOCUMENTS 8,717,224 B2 * 5/2014 Jeong ........................ H01Q 5/42
  342/93
9,568,600 B2 * 2/2017 Alland .................. G01S 7/2925
  (Continued)

FOREIGN PATENT DOCUMENTS

CN    104067143 A    9/2014
DE    102013216951 A1    2/2015
  (Continued)

OTHER PUBLICATIONS

Office Action issued in corresponding European Patent Application No. 19168195.6, dated Sep. 21, 2021.
  (Continued)

*Primary Examiner* — Olumide Ajibade Akonai
(74) *Attorney, Agent, or Firm* — Morgan, Lewis & Bockius LLP

(57) ABSTRACT

The present provides a radar apparatus and an antenna apparatus for the radar apparatus. Two transmission antennas disposed on both sides of the transmission antenna set may be arranged apart from each other by a predetermined vertical distance in a first direction perpendicular to the ground, and the four receiving antennas may be disposed apart from each other by a predetermined horizontal distance, so that the vertical information and the horizontal information of the object can be easily obtained in the long range detection mode and the short range detection mode.

18 Claims, 11 Drawing Sheets

(51) Int. Cl.
*G01S 13/42* (2006.01)
*G01S 13/86* (2006.01)
*G01S 13/931* (2020.01)
*H01Q 21/06* (2006.01)

(58) Field of Classification Search
CPC .......... G01S 7/02; G01S 13/4463; G01S 7/03; G01S 2013/0245; G01S 7/006; G01S 2013/93271; G01S 7/282; G01S 7/352; G01S 13/003; G01S 2013/0254; H01Q 21/06; H01Q 1/3233; H01Q 25/00; H01Q 3/26; H01Q 21/061; H01Q 21/00; H01Q 21/065; H01Q 21/08; H01Q 1/125; H01Q 21/22; H01Q 21/24; H01Q 21/0025; H04B 7/0413

See application file for complete search history.

(56) References Cited

U.S. PATENT DOCUMENTS

| | | | | |
|---|---|---|---|---|
| 10,816,641 | B2* | 10/2020 | Koerber | H01Q 21/22 |
| 10,823,819 | B2* | 11/2020 | Loesch | G01S 13/42 |
| 10,823,836 | B2* | 11/2020 | Wintermantel | G01S 13/584 |
| 11,131,749 | B2* | 9/2021 | Loesch | H01Q 21/28 |
| 2008/0024353 | A1 | 1/2008 | Schneider | |
| 2014/0104097 | A1* | 4/2014 | Binzer | H01Q 21/061 342/74 |
| 2014/0340253 | A1 | 11/2014 | Koerber et al. | |
| 2015/0204972 | A1 | 7/2015 | Kuehnle et al. | |
| 2016/0033632 | A1* | 2/2016 | Searcy | G01S 13/424 342/153 |
| 2017/0082730 | A1 | 3/2017 | Kishigami et al. | |
| 2017/0293028 | A1 | 10/2017 | Trummer | |
| 2017/0307744 | A1 | 10/2017 | Loesch et al. | |
| 2018/0088224 | A1* | 3/2018 | Kishigami | G01S 13/46 |
| 2018/0149735 | A1* | 5/2018 | Lim | G01S 13/42 |

FOREIGN PATENT DOCUMENTS

| | | |
|---|---|---|
| EP | 3156817 A1 | 4/2017 |
| EP | 3413077 A1 | 12/2018 |
| JP | 2013-044602 A | 3/2013 |
| JP | 2017-534881 A | 11/2017 |
| KR | 10-20090007261 A | 1/2009 |

OTHER PUBLICATIONS

Office Action issued in Korean Patent Application No. 10-2018-0040831 dated Feb. 18, 2020.
Extended European Search Report dated Sep. 2, 2019 issued in European Patent Application No. 19168195.6.
Office Action issued in corresponding Chinese Patent Application No. 201910279558.0 dated Oct. 8, 2022.

* cited by examiner

RADAR APPARATUS AND ANTENNA APPARATUS THEREFOR

CROSS REFERENCE TO RELATED APPLICATION

This application claims priority from Korean Patent Application No. 10-2018-0040831, filed on Apr. 9, 2018, which is hereby incorporated by reference for all purposes as if fully set forth herein.

BACKGROUND OF THE INVENTION

1. Field of the Invention

The present disclosure relates to a radar apparatus and an antenna apparatus, more particularly, to a radar apparatus including a multi-input multi-output (hereafter, referred to as 'MIMO') antenna and obtaining azimuth information and elevation information of an object at a mid/long distance and a short distance by using the antenna.

2. Description of the Prior Art

A radar apparatus for vehicles should have high resolution and angular resolving power. For example, automotive radars for preventing a front collision can determine interruption by extracting an angle in in-path cut-in and cut-out of a vehicle running ahead in adjacent lanes. That is, it is possible to secure safety for a driver by reducing mis-detecting of a target and estimating a collision situation in cut-in and cut-out using the high resolution and angular resolving power.

Further, automotive radars require a mid/long-range detection function for sensing objects at long distances in a relatively small angular range and a short-range detection function for sensing objects at short distances within a relatively large angle range, using one antenna system.

Further, a radar apparatuses generally include arrangement of a plurality of receiving antennas to obtain high angular resolving power. That is, radar apparatuses of the related art use a structure that increases angular resolving power by arranging receiving antennas in a plurality of channels.

Radar apparatuses having a structure including arrangement of a plurality of receiving antennas in the related art are structurally large in size due to the antennas and require many elements related to a transceiver (that is, an RF circuit), so the size of the entire antenna system is increased.

However, at present, the portion of vehicles where a radar apparatus can be mounted is limited due to a plurality of the support structures such as an ultrasonic sensor in the bumper, the license plate and the fog lamps, so radar apparatuses are unavoidably limited in size.

Recently, a MIMO radar has been developed to reduce the size of automotive radars.

The MIMO radar has an effect of expanding an aperture of a receiving antenna by arranging transmission antennas with an appropriate gap, so it has been recently actively researched in order to reduce the number of RF chips and without reducing performance.

The MIMO radars for a vehicle generally provide an efficient aperture expansion effect by usually arranging two transmitting channels and a several receiving channels, and this structure has been proposed for long-range radars or mid-range radars of automotive radars.

However, automotive radars need to detect wide areas not only at a mid/long distance, but a short distance, so they require an additional sensor for short-range sensing, and accordingly, the costs and complication are increased.

Accordingly, it is required to combine a mid/long-range radar and a short-range radar for automotive radars, and generally, different transmission antennas are configured and receiving antennas are shared to combine a mid/long-range radar and a short-range radar. However, performances such as resolving power of the mid/long-range radar are deteriorated and performances such as detecting range of the short-range radar are deteriorated, so their performances cannot be maximized.

Accordingly, there is a need to develop a radar apparatus that can detect both of a mid/long distance and a short distance and can be down-sized with resolution and angular resolving power maintained at a high level, but conventional radar apparatuses cannot satisfy these requirements.

SUMMARY OF THE INVENTION

For this background, an object of the present disclosure is to provide a radar apparatus of which the performance can be maximized up to not only mid/long-range performance, but short-range performance by efficiently arranging a plurality of transmission antennas and a plurality of receiving antennas.

Another object of the present disclosure is to provide an antenna that can perform multi-input multi-output (MIMO) by a plurality of transmission antennas and a plurality of receiving antennas, and a radar apparatus including the antenna.

Another object of the present disclosure is to provide an antenna system in which two transmission antennas are arranged apart from each other by a predetermined vertical distance in a first direction perpendicular to the ground, a transmission signal is transmitted from two transmission antennas at the same time, a reflection signal reflected by the object is received and processed, so that can acquire the horizontal information and vertical information of a target object both in the mid/long range detection mode and the short range detection mode.

Another object of the present disclosure is to provide an antenna structure of a radar device for obtaining horizontal information and vertical information for a target object in which two transmission antennas disposed on both sides among three transmission antennas are arranged apart from each other by a predetermined vertical distance in a first direction perpendicular to the ground, and four receiving antennas which are arranged apart from each other by a predetermined horizontal distance in a horizontal direction.

Another object of the present disclosure is to provide a radar apparatus in which the shapes of the signal waveform and the frequency band of the transmission signal in the mid/long range detection mode and the short range detection mode are different from each other so that it is possible to improve the measurement resolution of the horizontal/vertical information of the object in both the long distance and the near distance while avoiding interference with other radar devices.

In accordance with an aspect of the present disclosure, there is provided a radar apparatus, the radar apparatus including: an antenna member configured to include a transmission antenna set including at least one first transmission antenna or a second transmission antenna spaced apart from the first transmission antenna by a first vertical distance in a first direction perpendicular to a ground and a receiving antenna set including at least one receiving antenna disposed at the same vertical position as the first transmission antenna or the second transmission antenna; a transceiver configured to transmit a transmission signal by using at least one of the transmission antenna in a first detection mode or a second detection mode and to receive a reflection signal by using all of the receiving antennas; and a processor configured to process the reflection signal received from the receiving antenna and to acquire at least one of a horizontal information or a vertical information of an object.

The receiving antenna set may include a first receiving antenna, a second receiving antenna, a third receiving antenna, a fourth receiving antenna which are sequentially spaced apart from each other in a second direction perpendicular to the first direction. In addition, the first receiving antenna and fourth receiving antennas are spaced apart from a midpoint between the second receiving antenna and the third receiving antenna by a first horizontal distance A respectively.

The first transmission antenna may include a first-1 transmission antenna including 4 or 6 array antennas and a first-2 transmission antenna including two array antennas, and the second transmission antenna may include 4 or 6 transmission array antennas, and the first-1 transmission antenna and the second transmission antenna may be spaced apart from each other by a second horizontal distance 2A corresponding to twice the first horizontal distance in a second direction.

In this case, each of the first receiving antenna and the fourth receiving antennas may include two array antennas, and each of the second receiving antenna and the third receiving antenna may include one array antenna. The signals received from the second receiving antenna and the third receiving antenna may be combined and processed as one channel signal by the processor.

In order to obtain the horizontal information of the object, the transceiver may transmit a code-divided transmission signal from the first-1 transmission antenna and the second transmission antenna in the first detection mode for a medium range detection, and may receive reflection signals at all of the receiving antennas. In addition, the transceiver may transmit a transmission signal from the first-2 transmission antenna in the second detection mode for short distance detection, and may receive reflection signals at all of the receiving antennas.

In order to obtain the vertical information of the object, the transceiver may transmit a code-divided transmission signal from the first-1 transmission antenna and the second transmission antenna, and may receive reflection signals at all of the receiving antennas.

In accordance with another aspect of the present disclosure, there is provided an antenna apparatus, the antenna apparatus including: a transmission antenna set including at least one first transmission antenna and a second transmission antenna spaced apart from the first transmission antenna by a first vertical distance in a first direction perpendicular to a ground; and a receiving antenna set including four receiving antennas disposed at the same vertical position as the first transmission antenna or the second transmission antenna and spaced apart from each other by a predetermined horizontal distance in a horizontal direction perpendicular to the first direction.

As described below, according to the present disclosure, it is possible to provide a radar device capable of maximizing a short distance detection performance as well as a medium/long range detection performance through an efficient arrangement of a plurality of transmission antennas and a plurality of receiving antennas.

More specifically, two transmission antennas are arranged apart from each other by a predetermined vertical distance in a first direction perpendicular to the ground, and transmission signals are simultaneously transmitted from two transmission antennas, and reflection signal reflected from the object is received and processed so that the radar apparatus can acquire the horizontal information and the vertical information with high resolution in the medium/long range detection mode and the short range detection mode.

According the antenna apparatus of the present disclosure, two antenna elements arranged on both sides among the three transmission antennas may be disposed apart from each other by a predetermined vertical distance in a first direction perpendicular to the ground, and the four receiving antennas may be disposed apart from each other by a predetermined horizontal distance, so that the vertical information and the horizontal information of the object can be easily obtained in the long range detection mode and the short range detection mode.

According the antenna apparatus and the radar apparatus of the present disclosure, the shapes of the frequency band and the signal waveform of the transmission signal may be different from each other in the long range detection mode and the short range detection mode, so that the measurement resolution of the horizontal/vertical information of the object may be improved in both long range detection mode and the short range detection mode, and an interference with other radar devices may be prevented.

DETAILED DESCRIPTION OF THE EXEMPLARY EMBODIMENTS

Figure 1A:
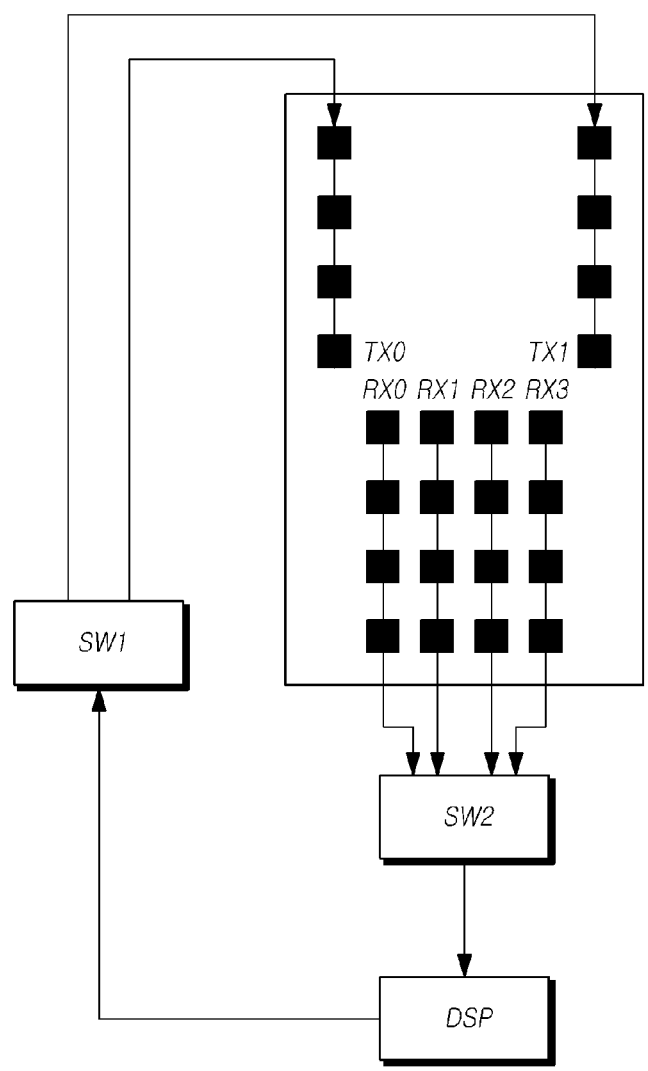
FIG. 1 shows an example of a radar apparatus having a common multi-antenna.

Hereinafter, embodiments of the present disclosure will be described with reference to exemplary diagrams. In the specification, in adding reference numerals to components throughout the drawings, it should be noted that like reference numerals designate like components even though components are shown in different drawings. Further, in describing embodiments of the present disclosure, well-known functions or constructions will not be described in detail since they may unnecessarily obscure the understanding of the present disclosure.

Further, terms such as 'first', 'second', 'A', 'B', '(a)', and '(b)' may be used for describing components of the present disclosure. These terms are used only for discriminating the components from other components, so the essence or order of the components indicated by those terms is not limited. It should be understood that when one element is referred to as being "connected to", "combined with" or "coupled to" another element, it may be connected directly to or coupled directly to another element, or another element may be "connected", "combined", or "coupled" between them.

FIG. 1 shows an example of a radar apparatus having a general multi-antenna.

As shown in FIG. 1A, a radar apparatus has an antenna system in which two transmission antennas TX0 and TX1 are disposed in the same direction at the upper portion and four receiving antennas RX0~RX3 are disposed in the same direction at the lower portion.

When a signal is to be transmitted, one transmission antenna is selected by a first switch SW1 and transmits a transmission signal.

A reception signal reflected from an object is received by one receiving antenna switched by a second switch SW2.

A signal processor DSP can measure the distance from the object and the relative speed of the object by measuring a phase change, a magnitude change, a frequency difference etc. by amplifying a received reflection signal and comparing the amplified signal with the transmission signal.

In FIG. 1A, the antennas are one-line array antennas.

Figure 1B:
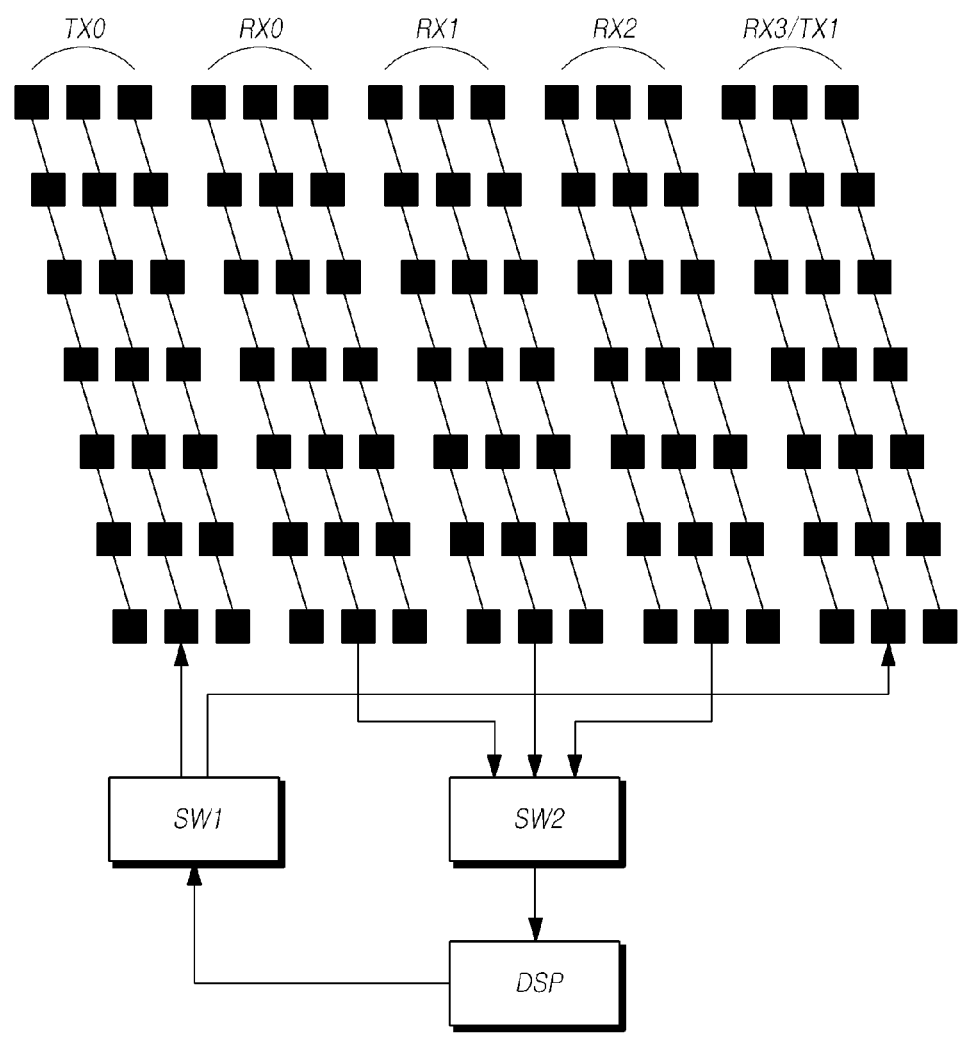

FIG. 1B shows an example of another multi-antennal radar apparatus, in which one transmission antenna TX0, a plurality of receiving antennas RX0~RX2, and one transmitting-receiving antenna RX3/TX1 are arranged with gaps therebetween and the antennas are elongated in the same directions.

In this configuration, when a signal is to be transmitted, one of the transmission antenna TX0 and the transmitting-receiving antenna RX3/TX1 is selected by a first switch SW1 and transmits a transmission signal.

A reception signal reflected from an object is received by one of the receiving antennas RX0~RX2 and the transmitting-receiving antenna RX3/TX1 selected by a second switch SW2.

A signal processor DSP can measure the distance from the object and the relative speed of the object by measuring a phase change, a magnitude change, a frequency difference etc. by amplifying a received reflection signal and comparing the amplified signal with the transmission signal.

Although the radar apparatus having the antenna system shown in FIG. 1 can perform mid/long-range sensing and short-range sensing, has difficulty in having sufficient resolution or angular resolving power in both of the mid/long-range sensing and short-range sensing.

Further, in the antenna system shown in FIG. 1A, a plurality of transmission antennas is elongated in the same direction and a plurality of receiving antennas is also elongated in the same direction, and in FIG. 1B, all transmitting and receiving antennas are elongated in the same direction.

Therefore, according to the antenna system, it is possible to exactly sense azimuth information, but it is difficult to precisely measure elevation information.

That is, in the antenna system shown in FIG. 1, any one or more of the receiving antennas RX0 to RX3 receive a reflection signal, but the receiving antennas have different horizontal arrangement characteristic from the transmission antenna TX0 or TX1, so there are differences in the reception signals received by the receiving antennas. Accordingly, azimuth information can be exactly measured by analyzing the differences.

However, the receiving antennas have the same arrangement characteristic in the elevation direction as the transmission antenna TX0 or TX1, so there is no difference in the reception signals received by the receiving antennas, and thus, it is difficult to measure elevation information of an object.

Accordingly, in an embodiment of the present disclosure, there is provided an antenna system in which one of the plurality of transmission antennas is spaced apart from the other transmission antennas by a predetermined vertical distance in the vertical direction (first direction perpendicular to the ground), and transmission signals are simultaneously transmitted from two transmission antennas spaced apart in the vertical direction, and the reflection signal received from the plurality of receiving antennas is processed, so that it is possible to obtain the horizontal information and the vertical information of the object with good resolution both in the long range detection mode and the short range detection mode.

Figure 2:
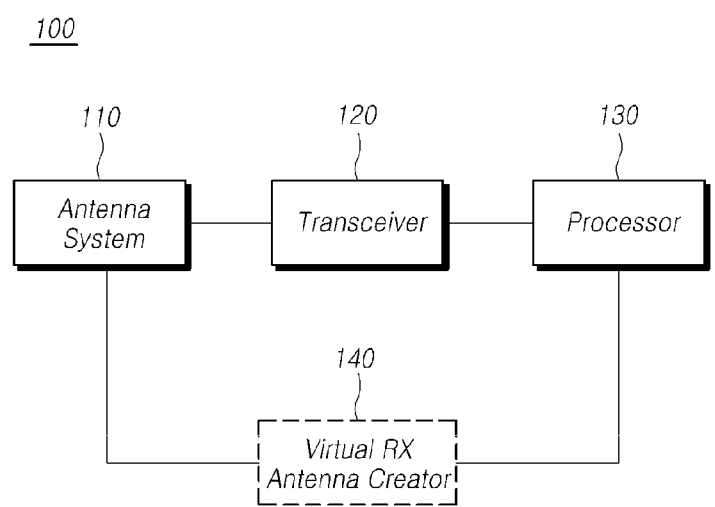
FIG. 2 is a schematic diagram of a radar apparatus according to an embodiment of the present disclosure.

FIG. 2 is a block diagram of a radar apparatus 100 according to an embodiment of the present disclosure.

As shown in FIG. 2, the radar apparatus 100 according to an embodiment of the present disclosure includes an antenna system 110 or an antenna member including a plurality of transmission antennas and a plurality of receiving antennas, a transceiver 120 transmitting transmission signals and receiving reception signals through the antenna system 110, and a processor 130 for processing the reception signal and calculating horizontal and/or vertical position information of the object. The radar apparatus is also called a radar sensor.

The antenna system 110 may include a transmission antenna set including at least one first transmission antenna and a second transmission antenna spaced apart from the first transmission antenna by a first vertical distance B in a first direction perpendicular to a ground and a receiving antenna set including at least one receiving antenna disposed at the same vertical position as the first transmission antenna.

As an example of the antenna system 110, the transmission antenna set may include three transmission antennas extending in a first direction perpendicular to the ground or in a vertical direction, and the receiving antenna set may include four receiving antennas extending in the first direction and disposed apart from the transmission antenna set by predetermined distance in a second direction perpendicular to the first direction.

That is, the radar apparatus according to the present embodiment has three transmission channels (transmission antennas) and four receiving channels (receiving antennas).

In addition, the transmission antenna set may include a first transmission antenna including a first-1 transmission antenna TX0 and a first-2 transmission antenna TX1 having the same vertical position as the receiving antennas, a second transmission antenna TX2 spaced apart by a first vertical distance B from the first transmission antenna.

The specific configuration of the antenna unit 110 will be described in more detail with reference to FIG. 3 below.

The transceiver 120 includes: a transmitter that switches to one of the transmission antennas included in the antenna system 110 having a structure to be described with reference to FIG. 2 etc. and transmits a transmission signal through the switched transmission antenna or through a multi-transmitting channel assigned to the transmission antennas; and a receiver that switches to one of the receiving antennas and receives a reception signal that is a reflection signal of the transmission signal reflected from a target through the switched receiving antenna or through a multi-receiving channel assigned to the receiving antennas.

More specifically, the transceiver 120 according to the present embodiment may be controlled to transmit a code-divided transmission signal from the first-1 transmission antenna TX0 and the second transmission antenna TX2 in the first detection mode for a medium/long range detection, and may receive reflection signals at all of the receiving antennas. In addition, the transceiver may be controlled to transmit a transmission signal from the first-2 transmission antenna TX1 in the second detection mode for short distance detection, and may receive reflection signals at all of the receiving antennas.

In addition, the processor 130 in the present embodiment may processes the transmission signal and the reception signal to calculate the position information of the object. More specifically, the processor 130 may calculate the position information of the object including the vertical information such as the elevation angle of the object and the mid/long range horizontal information such as the azimuth angle of the object exist in the mid/long distance by using the code-divided transmission signal transmitted from the first-1 transmission antenna TX0 and the second transmission antenna TX2 and the reception signal received at all of the receiving antennas In addition, the processor 130 may calculate the short range horizontal information such as the azimuth angle of the object exist in the short distance by using the transmission signal transmitted from the first-2 transmission antenna TX1 and the reception signal received at all of the receiving antennas At this instance, the processor 130 may synthesize the signals received from the second receiving antenna RX1 and the third receiving antenna RX2 and may process it as one channel signal.

The transmitter included in the transceiver 120 includes an oscillator that generates a transmission signal for one transmitting channel assigned to a switched transmission antenna or a multi-channel assigned to a plurality of transmission antennas. The oscillator, for example, may include a voltage-controlled oscillator (VCO) and an oscillator.

The receiver included in the transceiver 120 includes: a low-noise amplifier (LNA) that low-noise amplifies the reception signal received through one receiving channel assigned to a switched receiving antenna or through a multi-receiving channel assigned to a plurality of transmission antenna; a mixer that mixes the low-noise amplified reception signal; an amplifier that amplifies the mixed receiving signals; and an analog-to-digital converter (ADC) that generates reception data by digital-converting the amplified reception signal.

Referring to FIG. 2, the radar apparatus 100 according to an embodiment of the present disclosure includes a processor 130 that controls a transmission signal and performs signal processing using reception data. The processor 130 allows for reducing costs and hardware size too by efficiently distributing signal processing, which requires a large amount of calculation, to a first processor and a second processor.

The first processor included in the processor 130 is a pre-processor for the second processor and can obtain transmission data and reception data, control generation of a transmission signal by the oscillator based on the obtained transmission data, synchronize the transmission data and reception data, and changes frequencies of the transmission data and reception data.

The second processor is a post-processor that actually performs processing using the processing result of the first processor and can perform CFAR (Constant False Alarm Rate) calculation, tracking, and target selection on the basis of the reception data with frequency changed by the first processor, and perform extract angular information, speed information, and distance information on a target.

The first processor can buffer the obtained transmission data and reception data into a sample size that can be processed for one cycle and change the frequency. The frequency change by the first processor may use Fourier transform such as FFT (Fast Fourier Transform).

The second processor may perform second Fourier transform on the signals that has undergone first Fourier transform (FFT) by the first processor and the second Fourier transform, for example, may be Discrete Fourier Transform (hereafter, referred to as 'DFT'). Further, it may be chirp-DFT of DFT.

The second processor obtains frequency values corresponding to a second Fourier transform length (K) through the second Fourier transform, calculates a bit frequency having the largest power for each chirp period on the basis of the obtained frequency values, and obtain speed information and distance information of an object on the basis of the calculated bit frequency, whereby it can detect an object.

Figure 3:
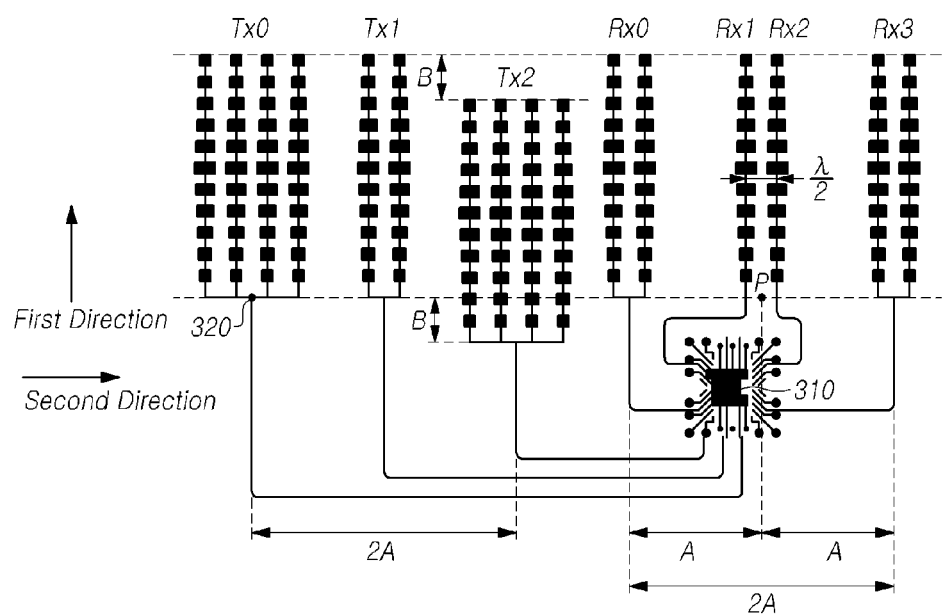
FIG. 3 shows a first embodiment of arrangement of a plurality of transmission antennas and a plurality of receiving antennas included in an antenna system included in the radar apparatus according to an embodiment of the present disclosure.

Meanwhile, the radar apparatus according to this embodiment may include the antenna systems shown in FIG. 3, and the transceiver 120 and the processor 130 may perform a predetermined signal transmitting/receiving manner and information calculation manner in order to acquire the vertical information and horizontal information of the object in both the mid/long range detection mode and the short range detection mode. These manners will be described in more detail below with reference to FIGS. 4-6.

The antenna system 110 included in the radar apparatus 100 according to an embodiment of the present disclosure may include a plurality of transmission antennas and a plurality of receiving antennas, and each of the transmission antennas and the receiving antennas may be array antennas of which a plurality of transmitting/receiving elements is connected in series by transmission wires, but they are not limited thereto.

However, the antennas used in this embodiment are elongated in predetermined directions and the directions mean the directions in which the antennas are elongated with respect to a transmission port connected to a processor 130.

FIG. 3 shows a first embodiment of arrangement of a plurality of transmission antennas and a plurality of receiving antennas included in an antenna system included in the radar apparatus according to an embodiment of the present disclosure.

For convenience, the up-direction of the vertical directions is defined as a first direction and the down-direction of the vertical directions is defined as a second direction herein.

In the antenna system according to an example of FIG. 3, the receiving antenna set may include a total of four receiving antennas, and the first receiving antenna RX0, the second receiving antenna RX1, the third receiving antenna RX2, and the fourth receiving antenna RX3 are sequentially arranged spaced apart in the second direction perpendicular to the first direction.

In addition, each of the first receiving antennas RX0 and the fourth receiving antennas RX3 may be disposed apart from a midpoint between the second receiving antenna RX1 and the third receiving antenna RX2 by a first horizontal distance A.

Each of the first receiving antenna RX0 and the fourth receiving antenna RX3 may be configured as two array antennas and the second receiving antenna RX1, and each of the third receiving antenna RX2 may be configured as a single array antenna. The processor may synthesize the signals received from the second receiving antenna RX1 and the third receiving antenna RX2 to process as one channel signal.

Alternatively, each receiving antenna may comprise a larger number of array antennas than one or two array antennas.

The transmission antenna set may include a total of three transmission antennas. The first transmission antenna may include the first-1 transmission antenna TX0 including 4 or 6 array antennas, and the first-2 transmission antenna TX1 including two array antennas, and the second transmission antenna may include the second transmission antenna TX2 including 4 or 6 array antennas. The first-1 transmission antenna TX0 and the second transmission antenna TX2 may be disposed apart from each other by a second horizontal distance 2A corresponding to twice the first horizontal distance in the second direction.

In addition, the second transmission antenna TX2 may be disposed apart from the first-1 transmission antenna TX0 and the first-2 transmission antenna TX1 by a first vertical distance B in the first direction.

That is, the first-1 transmission antennas TX0 and second transmission antennas TX2 may be configured to include 4 or 6 array antennas which are connected to the same feed line to and simultaneously transmit a transmission signal. Alternatively, the first-1 transmission antennas TX0 and second transmission antennas TX2 may be configured to include one or more array antennas depending on the required detection resolution.

In general, as the aperture of the transmission antenna becomes larger, the transmission beam becomes sharp and the linearity of the transmission beam becomes higher. Therefore, it is possible to further improve the straightness of the transmission signal and the detecting distance by setting the number of array antennas of the first-1 transmission antenna TX0 and the second transmission antenna TX2 used in the long range detection mode to four or six.

Also, the first-2 transmission antenna TX1 is not necessarily composed of two array antennas, and may be composed of one or more array antennas.

The each of the array antennas constituting the transmission antenna and the receiving antenna may include a plurality of elements or patches connected through a transmission line and a plurality of elements or patches may be extended to up-direction of the first direction from a start point that is a feeding port 320 connected to a chip 310 including a signal processor.

Meanwhile, the transmission antennas and the receiving antennas constituting the antenna apparatus according to the present embodiment may have a predetermined arrangement interval and will be described in detail below.

First, the center point P between the second receiving antenna RX1 and the third receiving antenna RX2 is located apart from the center point of the two array antennas constituting the first receiving antenna RX0 by the first horizontal distance A in the horizontal direction (i.e. the second direction). In addition, the center point of the two array antennas constituting the fourth receiving antenna RX3 is spaced apart from the center point P between the second receiving antenna RX1 and the third receiving antenna RX2 by a first horizontal distance A.

Meanwhile, the second receiving antenna RX1 and the third receiving antenna RX2 may be arranged to be spaced apart from each other by a half ($0.5\lambda$) of the wavelength of the transmission signal in the horizontal direction. In addition, an interval between the two array antennas constituting each of the first receiving antenna RX0 and the fourth receiving antenna RX3 may also be a half ($0.5\lambda$) of the wavelength of the transmission signal.

In addition, the interval between the two, four or six array antennas constituting each of the three transmission antennas may also be arranged to be spaced by a half ($0.5\lambda$) of the wavelength of the transmission signal.

In this manner, the signals received from the second receiving antenna RX1 and the third receiving antenna RX2 are synthesized to be used as one channel signal, and the horizontal distance between the second receiving antenna RX1 and the third receiving antenna RX2 is set to a half ($0.5\lambda$) of the wavelength of the transmission signal, so that the angle ambiguity due to the grating lobe may be eliminated.

That is, the grating lobe may occur because the interval between the receiving antennas is equal to or greater than a half ($0.5\lambda$) of the wavelength of the transmission signal. However, according to the present embodiment, the second receiving antenna RX1 and the third receiving antenna RX2 may be disposed so as the horizontal distance between the second receiving antenna RX1 and the third receiving antenna RX2 is $0.5\lambda$ and the angular information extracted from the two channels is compared and compensated, so that the angle uncertainty due to the grating lobe may be minimized.

As described above, the vertical information of the object such as an elevation angle may be accurately measured by arranging at least two of the transmission antennas among the plurality of the transmission antennas constituting the transmission antenna being apart from each other by a predetermined vertical distance B in the vertical direction perpendicular to the ground.

In this case, the vertical distance B may be determined in consideration of the frequency of the transmission signal and the measurement accuracy of vertical information of the object.

In the antenna system of the radar apparatus according to the present embodiment, the horizontal distance 2A between two transmission antennas, that is, the first-1 transmission antenna TX0 and the second transmission antenna TX2 for simultaneously transmitting a transmission signal by code division may be a same distance as the horizontal distance 2A between the two receiving antennas disposed at the outermost of the four receiving antennas constituting the receiving antenna set, that is, the first receiving antenna RX0 and the fourth receiving antenna RX3.

According to this arrangement, as described below, the entire aperture of the entire receiving antenna including the virtual receiving antenna formed in the receiving antenna set by the code division transmission and the real receiving antenna as the actual receiving antenna may be expanded, thereby the measurement resolution of the horizontal information in the mid/long range detection mode may be improved.

The formation of the virtual receiving antenna and the corresponding aperture expansion effect will be described in more detail below with reference to FIG. 4.

In addition, the horizontal distance 2A between the first-1 transmission antenna TX0 and the second transmission antenna TX2 for simultaneously transmitting a transmission signal by code division is set to a same distance as the horizontal distance 2A between the first receiving antenna RX0 and the fourth receiving antenna RX3, so that the transmission beam may be kept sharp and thereby the detection performance of the radar may be improved.

In addition, it is possible to form a grating lobe occurring a deterioration of the performance of the antenna at the position away from the main beam or the main lobe thereby the horizontal direction detection resolution in both detection modes may be improved.

Figure 4A:
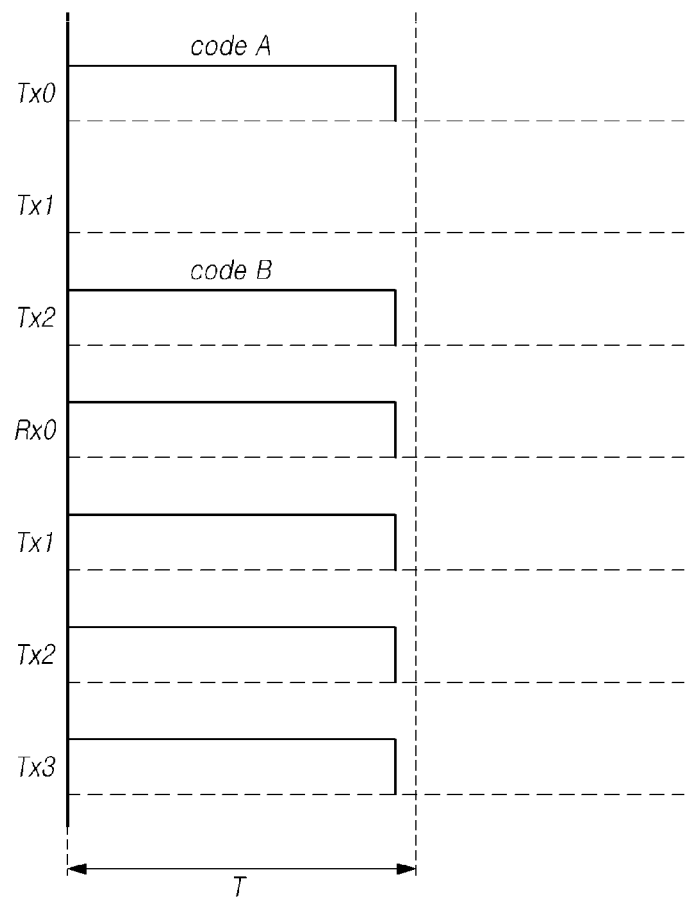
FIG. 4 shows a case of detecting azimuth information using the radar apparatus according to the present disclosure, particularly, in which a timing diagram of signals in a mid/long-range detection mode (FIG. 4A) and an equivalent state diagram of transmitting and receiving antennas in this case (FIG. 4B) are provided.
Figure 4B:
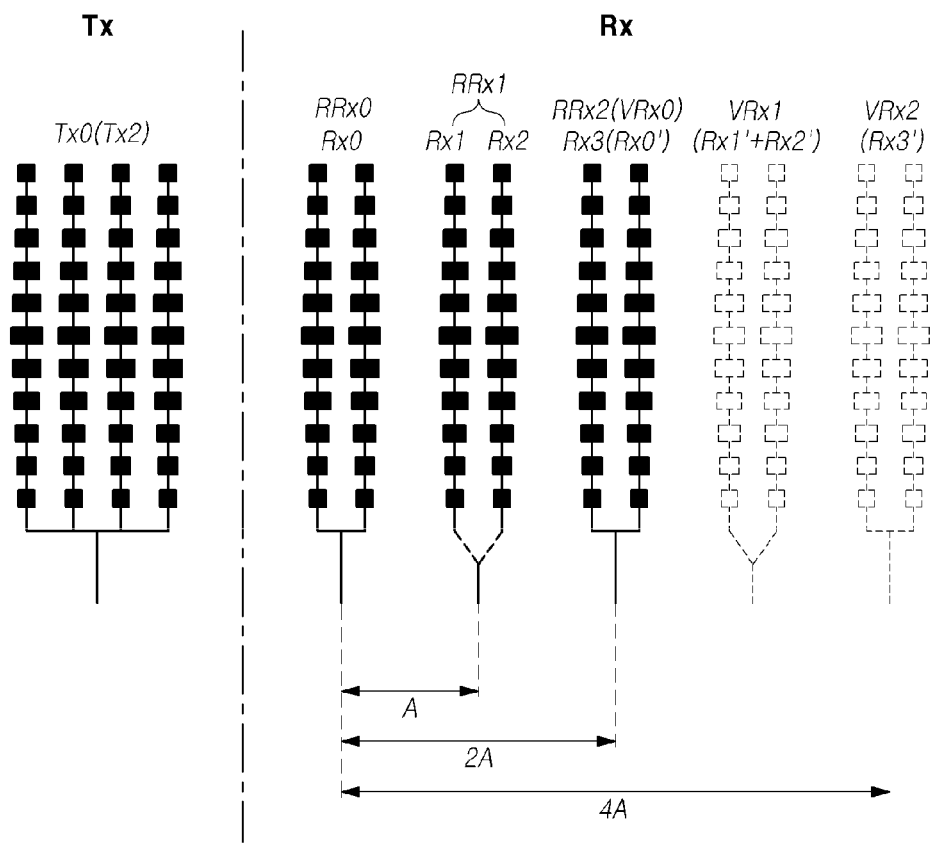

FIG. 4 shows a case of detecting azimuth information using the radar apparatus according to the present disclosure, particularly, in which a timing diagram of signals in a mid/long-range detection mode (FIG. 4A) and an equivalent state diagram of transmitting and receiving antennas in this case (FIG. 4B) are provided.

The transmission signal may be simultaneously transmitted by the first-1 transmission antenna TX0 and the second transmission antenna TX2 in the transmission mode in order to measure the horizontal information of the object at the medium or long distance by using the radar according to the present invention.

Meanwhile, in the reception mode in which the signal reflected from the object is received, the signals received from all the receiving antennas included in the receiving antenna set, i.e., the receiving antennas RX0 through RX3 may be used to acquiring the horizontal information of the object at the medium or long distance. At this case, the signals received from the second receiving antenna RX1 and the third receiving antenna RX2 may be synthesized and used as one channel signal.

In the following description, each of a total of three transmission antennas TX0, TX1, and TX2 included in the transmission antenna set may be represented by the respective transmission channel, and each of a total of four receiving antennas RX1, RX2, RX3 and RX4 may be expressed as the respective receiving channel.

Accordingly, the radar apparatus according to the present embodiment may utilize two transmission channels and three receiving channels for acquiring the horizontal information in the long range detection mode. Specifically, the first-1 transmission antenna TX0 and the second transmission antenna TX2 of the two transmission channels may simultaneously transmitting the code-divided transmission signals in the transmission mode, and the receiving signal received from the three receiving channels (i.e., three channels of RX0, RX1+RX2 and RX3) may be used in the reception mode.

FIG. 4A is a timing diagram of the signal transmission and reception in the mid/long range detection mode.

Referring to FIG. 4A, the first-1 transmission antenna TX0 and the second transmission antenna TX2 may be turned ON for a predetermined period of time in one predetermined detection period (0~T) and may transmit one transmission signal having the first code A and the other transmission signal having the second code B at the same time.

Meanwhile, each of the four receiving antennas RX0 to RX3 may receive the reflection signal during the same detection period (0~T). The processor 130 may analyze the receiving signals received from four receiving antennas and three channels (RX1 and RX2 are combined and used as one channel) and may obtain the horizontal information (width, etc.) of the object in the middle or long distance.

FIG. 4B is an equivalent state diagram of transmission and receiving antennas in the mid/long range detection mode.

The equivalent state diagram of FIG. 4B may illustrate the arrangement state of the receiving antennas when two transmission antennas transmitting the code-divided transmission signals are set to one transmission channel, and thereby the degree of aperture of the radar device may be confirmed.

In case that the signal transmission are performed according to FIG. 4A in the mid/long range detection mode, the position of the first-1 transmission antenna TX0 may be assumed as a reference position in FIG. 4B since the horizontal information of the object may be not affected by the vertical separation of the first transmission antenna and the second transmission antenna.

In this case, since the first-1 transmission antenna TX0 and the second transmission antenna TX2 transmitting the code-divided transmission signals are spaced apart by the second horizontal distance 2A in the horizontal direction, the receiving antenna receiving the reflection signal reflected from the object may have the same effect as that the first code division receiving signal and the second code division receiving signal which have the same shape are shifted spatially in the horizontal direction by 2A.

At this case, a receiving antenna which is virtually present due to the horizontal separation of transmission antennas may be expressed as "a virtual receiving antenna" in a concept distinguishable from actual receiving antennas.

Assuming that the first-1 transmission antenna TX0 in FIG. 4B is a reference, the first receiving antenna RX0, the second receiving antenna RX1, the third receiving antenna RX2 and the fourth receiving antenna RX3 may be real receiving antennas.

Meanwhile, FIG. 4 is for the case of obtaining horizontal direction information so that the vertical separation of the transmission and receiving antennas may not be considered. Therefore, for the sake of convenience, the vertical direction (first direction) separation is not shown in FIG. 4.

In addition, as described above, since the second receiving antenna RX1 and the third receiving antenna RX2 may be synthesized as one signal in the receiving mode, they may be represented by one channel.

As a result, as shown in FIG. 4B, three real receiving antennas including a first real receiving antenna RRX0, a second real receiving antenna RRX1 and a third real receiving antenna RRX2 may be formed in the receiving part.

At this case, the second real receiving antennas antenna RRX2 arranged in the middle corresponds to a composite antenna of the second receiving antenna RX1 and the third receiving antenna RX2.

Meanwhile, the first-1 transmission antenna TX0 for transmitting the transmission signal with the first code is used as a reference and the second transmission antenna TX2 for simultaneously transmitting the transmission signal with the second code is spaced by 2A in the horizontal direction, thereby the receiving antenna that receives the signal transmitted from the second transmission antenna TX2 may have the same effect as that the position thereof may be shifted by 2A in the horizontal direction than the actual position. In this case, the receiving antenna formed at the shifted position may be expressed as a virtual receiving antenna VRX.

The real receiving antennas that receive the transmission signals of the first-1 transmission antenna TX0 may be represented as RX0, RX1, RX2 and RX3, and virtual receiving antennas that receive the transmission signals of the second transmission antenna TX1 may be represented as RX0', RX1', RX2' and RX3' in order to distinguish them from the real receiving antennas. In addition, the real receiving antennas may be indicated by a solid line and the virtual receiving antennas may be indicated by a dotted line in FIG. 4B.

Therefore, in FIG. 4B, three virtual receiving antennas including the first virtual receiving antenna VRX0, the second virtual receiving antenna VRX1 and the third virtual receiving antenna VRX2 having the same arrangement as the real receiving antennas may be formed at a position separated by 2A from the real receiving antenna.

In this case, the first virtual receiving antenna VRX0 may correspond to the virtual receiving antenna RX0' of the first receiving antenna RX0, the third virtual receiving antenna VRX2 may correspond to the virtual receiving antenna RX3' of the fourth receiving antenna RX3, and the second virtual receiving antenna VRX1 therebetween may correspond to the virtual receiving antenna RX1'+RX2' of the second and third receiving antenna which are synthesized into one signal.

As a result, three real receiving antennas RRX0, RRX1, and RRX2 and three channels of virtual receiving antennas VRX0, VRX1 and VRX2 may be formed in the receiving part.

Meanwhile, since the first-1 transmission antenna TX0 and the second transmission antenna TX2 are spaced apart by the horizontal distance 2A, the real receiving antennas and the corresponding virtual receiving antennas are also spaced apart by a horizontal distance 2A.

Since the first receiving antenna RX0 and the fourth receiving antenna RX3 are also horizontally spaced by the horizontal distance 2A, the position of the first virtual receiving antenna VRX0 may be exactly overlapped with the position of the third real receiving antenna RRX2 (i.e., the fourth receiving antenna RX3).

Therefore, as shown in FIG. 4B, a first real receiving antenna RX0 or RRX0, a second real receiving antenna RRX1 or a composite antenna of RX1+RX2, a third real receiving antenna RRX2 or RX3 and a first virtual receiving antenna VRX0 or RX0' overlapped therewith, a second virtual receiving antenna VRX1 or a composite antenna of RX1'+RX2', and a third virtual receiving antenna VRX2 or RX3' may be sequentially arranged with a horizontal distance A from the left side in the receiving part.

As a result, the entire aperture of the receiving antenna set, i.e., the horizontal distance between the first real receiving antenna RRX0 disposed at one end and the third virtual receiving antenna VRX2 disposed at the other end may be 4A.

Therefore, according to the radar apparatus of the present embodiment, the entire aperture of the receiving antenna may be extended to 4A, thereby improving the resolution of the horizontal direction information in the long range detection mode.

In general, since a radar apparatus performs an object detection function that detects the distance to an object and the speed and azimuth of the object using reception signals received through a plurality of receiving antennas, in which in order to increase precision of detection of an object (that is, increase resolution), it is preferable that the radar apparatus has an antenna system with an "expanded aperture structure" by increasing the gaps between the receiving antennas.

The distance from an end to the other end of a receiving antenna is the aperture and it is a very important factor of the performance of a radar apparatus to provide an expanded aperture performance by increasing the aperture of the receiving antenna.

By providing an antenna system with an expanded aperture structure, the position where a grating lobe is generated at the receiving end is moved closer to the center position where the main beam is positioned.

Accordingly, an "expanded aperture structure" or a "virtual antenna system" is provided for the radar apparatus according to an embodiment of the present disclosure in order to move the position where a grating lobe is generated away from the center position where the main beam is positioned, that is, to suppress grating lobe.

In order to have the virtual antenna system, as shown in FIG. 2, the radar apparatus 100 according to an embodiment of the present disclosure may further include a virtual RX antenna creator 140 for creating a plurality of virtual RX antennas.

The virtual RX antenna creator 140, as described above, can perform signal processing for generating signals having a predetermined phase difference that depends on the gap between receiving antennas on the basis of a signals received by actual receiving antennas.

That is, the virtual RX antenna creator 140 performs signal process for generating a virtual signal (a signal having a phase difference from the actually received signal) as if a signal has been received through a virtual RX antenna that virtually exists at a position where there is no actual receiving antenna.

The "creating a virtual RX antenna" herein may have the same meaning as "a reception signal that has not been actually received is generated". In this respect, the arrangement structure (gap, number etc.) of virtual RX antennas may have the same meaning as the structure (gap, number etc.) of reception signals that are not actually received.

By the virtual RX antenna creator 140, an antenna system in which not only a plurality of receiving antennas actually exist, but a plurality of virtual RX antennas virtually exist at the receiving end can be provided.

As described above, the antenna system including a plurality of virtual RX antennas virtually existing at the receiving end may be expressed as an "antenna system having a virtual aperture structure".

As described above, in order to obtain azimuth information or horizontal information in the mid/long-range detection mode, the transceiver 120 of the radar apparatus according to this embodiment, in the mid/long-range detection mode, may simultaneously transmit the code-divided signals through the first-1 transmission antenna TX0 and the second transmission antenna TX2 which are spaced apart from each other by the horizontal distance 2A and the vertical distance B, and may receive and analyze the signals received from the first real receiving antenna, the second real receiving antenna, the third real receiving antenna (or the first virtual receiving antenna), the second virtual receiving antenna and the third virtual receiving antenna which are sequentially spaced apart by a horizontal distance A, thereby it is possible to measure the horizontal information (azimuth angle, etc.) of the target at a medium or longer distance with high resolution.

As a result, the radar apparatus according to the present embodiment may provide the extended aperture performance and may be capable of precisely measuring the horizontal information of the medium or long distance object by using the antenna arrangement structure or the antenna system as shown in FIG. 3 and the signal transmission and receiving structure as shown in FIG. 4.

Figure 5A:
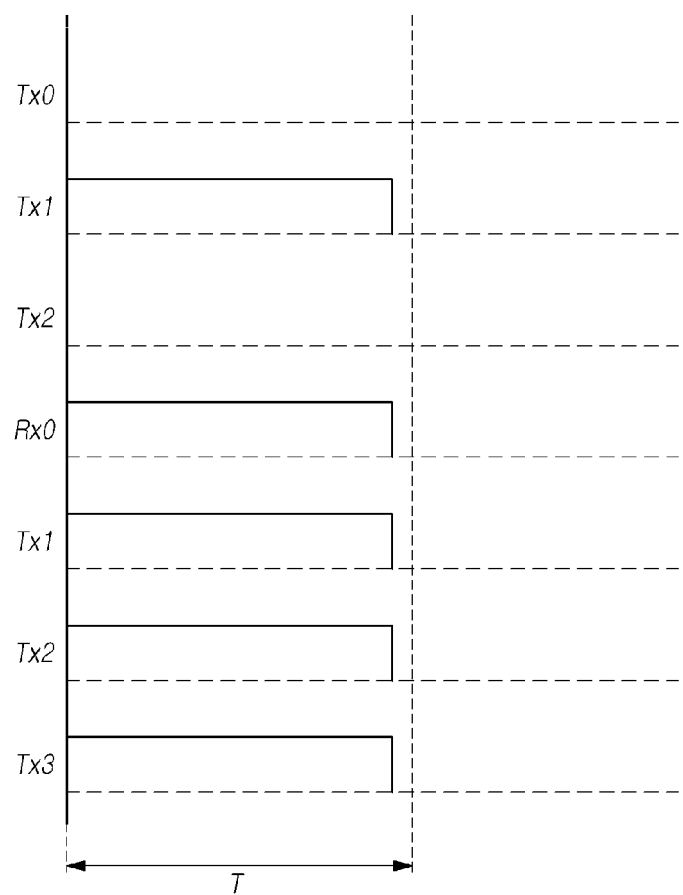
FIG. 5 shows a case of detecting azimuth information using the radar apparatus according to the present disclosure, in which a timing diagram of signals in a short range detection mode (FIG. 5A) and an equivalent state diagram of transmitting and receiving antennas in this case (FIG. 5B) are provided.
Figure 5B:
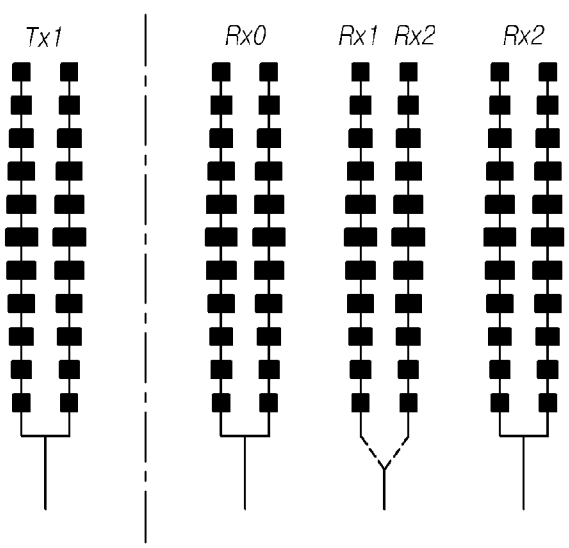

FIG. 5 shows a case of detecting azimuth information using the radar apparatus according to the present disclosure, in which a timing diagram of signals in a short range detection mode (FIG. 5A) and an equivalent state diagram of transmitting and receiving antennas in this case (FIG. 5B) are provided.

In order to obtain the position information of an object at a short distance, in the second detection mode as the short range detection mode, the transceiver 120 of the radar apparatus according to this embodiment may transmit transmission signals through the first-2 transmission antenna TX1 arranged in the center position among the three transmission antennas, and may receive a reflection signal through all of the four receiving antennas RX0 to RX3.

In this case, the second receiving antenna RX1 and the third receiving antenna RX2 also may be combined and used as one receiving channel, so that a total of one transmission channel and three receiving channels may be used in the short range detection mode.

Referring to FIG. 5A, the first-2 transmission antenna TX1 may be turned ON for a predetermined period of time in one detection period (0~T) and may transmit the transmission signal, and all of the four receiving antennas RX0 to RX3 may receive the reflection signals. (all of the four receiving antennas are turned ON)

The processor 130 may compare and analyze the transmission signal transmitted through the first-2 transmission antenna and the reception signal received through the four receiving antennas or three receiving channels, and may acquire the position information of the object in short distance.

Referring to FIG. 5B which is an equivalent state diagram of the antenna in the short range detection mode, the aperture of the transmission part may be set to $0.5\lambda$ which is the interval between two array antennas constituting the first-2 transmission antenna TX1. Thereby, it is possible to provide a transmission signal pattern with a relatively wide angle thereby to enlarge the detection area of the short range detection.

In addition, there is a possibility that a grating lobe may be generated since the horizontal distance between the receiving antennas A is $0.5\lambda$ or more. However, in this case, the distance between the second receiving antenna RX1 and the third receiving antenna RX2 may be set to $0.5\lambda$ so that the angle information extracted from the signals received by the two receiving antennas are compared with each other, and the angle ambiguity due to the grating lobe may be eliminated.

The radar apparatus 100 or the transceiver 120 and the processor 130 and the virtual RX antenna creator 140 included in the radar apparatus may be may be implemented as a radar control device that performs an object identification function by a radar or as a module of an ECU The radar control device or the ECU may include a processor, a storage such as and a memory and a computer program capable of performing a specific function. The transceiver 120, the processor 130, and the virtual RX antenna creator 140 may be implemented as software modules capable of performing their respective functions.

The radar apparatus 100 according to the present embodiment may be implemented as a computer system connected to the antenna system. The computer system may include one or more element of a processors, a memory, a storage, a user interface input and a user interface output, which are capable of communicating with one another via a communication bus.

In addition, the computer system may also include a network interface for connecting to a network.

The processor may be a CPU or a semiconductor device that executes processing instructions stored in memory and/or in the storage.

Memory and storage may include various types of volatile/non-volatile storage media. For example, the memory may include ROM and RAM.

In the radar apparatus having such a hardware configuration, a software or a program for performing the functions of the transceiver 120, the processor 130, and the virtual RX antenna creator 140 may be stored or installed in the memory or the storage unit, and may be executed by the processor.

More particularly, the computer system for performing the controlling of the radar apparatus 100 according to the present embodiment may execute software stored in a memory so as to transmit the transmission signal through the transmission antenna set and acquire the object information based on the reception signal received through the receiving antenna set as above.

Figure 6:
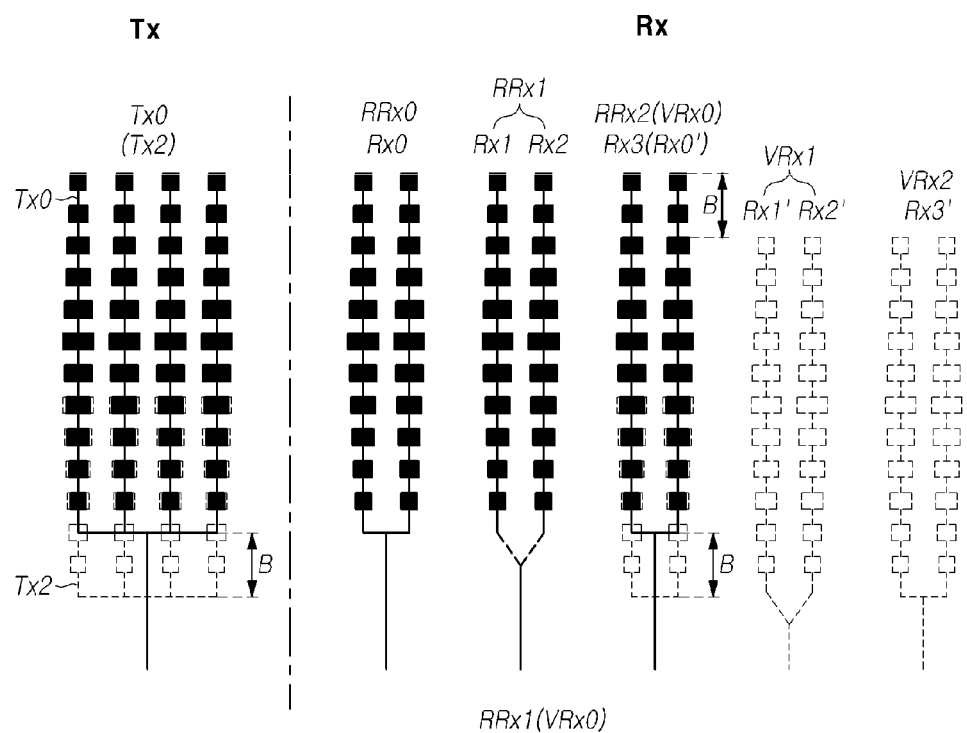
FIG. 6 is an equivalent state diagram of a transmission antenna and receiving antenna for detecting vertical information by using an antenna according to an embodiment of the present disclosure.

FIG. 6 is an equivalent state diagram of a transmission antenna and receiving antenna for detecting vertical information or the elevation information by using an antenna according to an embodiment of the present disclosure.

In the radar apparatus according to the present embodiment, a code-divided signals may be simultaneously transmitted from the first-1 transmission antenna TX0 and a second transmission antenna TX2 which are two transmission antennas spaced apart from each other by a vertical distance B in the vertical direction, and the reflection signals may be received from the plurality of receiving antennas, thereby it is possible to acquire the vertical information of the target such as the elevation angle.

In order to acquiring the vertical information of the target, in similar to the mid/long range detection mode, the transceiver 120 may be operable to turn ON the first-1 transmission antenna TX0 and the second transmission antenna TX2 for a predetermined period of time in one detection period (0~T) and may transmit one transmission signal having the first code A and the other transmission signal having the second code B at the same time.

Meanwhile, each of the four receiving antennas RX0 to RX3 may receive the reflection signal during the same detection period (0~T). The processor 130 may analyze the receiving signals received from four receiving antennas and three channels (RX1 and RX2 are combined and used as one channel) and may obtain the vertical information (height, etc.) or he elevation information of the object.

FIG. 6 is an equivalent state diagram of a transmission and receiving antenna for detecting vertical information. In FIG. 6, the position of a first-1 transmission antenna TX0 for transmitting a transmission signal with the first code may be used a reference position, and the horizontal position of the second transmission antenna TX2 for transmitting the transmission signal with the second code may be identically expressed as the horizontal position of the first-1 transmission antenna in order to illustrate only the vertical positional relationship.

In this case, the second receiving antenna RX1 and the third receiving antenna RX2 may be combined and used as one receiving channel. Therefore, as shown in the right part of FIG. 6, three real receiving antennas RRX0~RRX2 and the three virtual receiving antennas VRX0~VRX2 may be formed, and the third real receiving antenna RRX2 and the first virtual receiving antenna VRX0 may be exactly overlapped with each other in the horizontal direction but may be spaced apart from each other by the vertical distance B in the vertical direction.

As a result, if the code-divided transmission signals are transmitted from the first-1 transmission antenna TX0 and the second transmission antenna TX2 for vertical information detection, a first real receiving antenna RRX0 as the first receiving antenna RX0, a second real receiving antenna RRX1 as the combined antenna of second receiving antenna RX1 and a third receiving antenna RX2, a third real receiving antenna RRX2 as a third receiving antenna RX2 and a first virtual receiving antenna VRX0 or RX0' horizontally overlapped therewith, a second virtual receiving antenna (VRX1 or a combined antenna of RX1'+RX2'), and a third virtual receiving antenna VRX2 or RX3' are sequentially arranged in the receiving part of the antenna system.

In this case, since the first-1 transmission antenna TX0 and the second transmission antenna TX2 for transmitting the code division transmission signals are spaced apart from each other by a vertical distance B, the third real receiving antenna RRX2 and the first virtual receiving antenna VRX0 or RX0' horizontally overlapped therewith may be spaced apart from each other by the vertical distance B in the vertical direction.

Therefore, a phase difference or amplitude difference may occur between the receiving signals received by the respective reception channels or between the transmission signals and the corresponding receiving signals due to the vertical distance separation.

As a result, the vertical information such as the height of the object or the elevation angle may be acquired by comparing the phase difference or amplitude difference of the signal for each receiving channel.

That is, the propagation paths (propagation distance) of signals received by two receiving channels (for example, a third real receiving antenna and a first virtual receiving antenna) spaced by a vertical distance B in the vertical direction may be different from each other, thereby the phase or the amplitude of the receiving signal at each receiving channel may also be different from each other.

Accordingly, in the processor 130 of the radar apparatus may analyze the difference of the phase or the amplitude of the receiving signal at each receiving channel and can acquire the vertical information such as the height of the object.

Meanwhile, as described in FIG. 4, the same transmission and reception method is used for obtaining horizontal information in the long range detection mode.

Therefore, in order to obtain the horizontal information in the long range detection mode, phase compensation may be first performed based on the vertical separation of the signals received in each receiving channel of the equivalent antenna state as shown in FIG. 6, and then the processing for obtaining horizontal information may be performed.

That is, the vertical information of the object may be acquired first as shown in FIG. 6 based on the reception signal received by using the manner as shown FIG. 4, the compensation of the phase difference of the received signal due to the vertical spacing may be performed, and then the horizontal information of the long-distance object as described in FIG. 4B may be obtained.

The vertical information and the horizontal information of the object may be obtained with high precision in both the long range detection mode and the short range detection mode by using the manner described above with reference to FIGS. 4~6.

Therefore, according to the radar apparatus of the present embodiment, since the vertical information and horizontal information of the long range and the short range can be precisely measured without any physical change of the radar device or an additional device, the utility as the radar sensor for the vehicle may be maximized.

In addition, the radar apparatus according to the present embodiment may utilize a MIMO antenna system in order to achieve a high detection accuracy or resolution in vertical and horizontal directions.

More specifically, each transmission antenna may transmit a signal having an independent waveform different from each other in a MIMO system. That is, each transmission antenna transmits a signal of an independent waveform differentiating from that for the other transmission antennas, and each receiving antenna may determine the transmission antenna transmitting the transmission signal correspondent with the received signal reflected from the target due to the different waveforms of these signals.

In addition, the radar apparatus according to the present embodiment may be configured to include a radar housing for accommodating a substrate and a circuit including the transmission antenna and the receiving antenna, and a radome forming the exterior of the radar housing.

The radome may be made of a material capable of reducing the attenuation of the radar signal transmitted and received, and the radome may be constituted as a part of an outer surface of the vehicle component such as the front bumper, the rear bumper, the grill of the vehicle and the side body of the vehicle.

The radome of the radar apparatus according to the present embodiment may be disposed inside a vehicle grill, a bumper, a vehicle body, and may be disposed as a part of the outer surface of a part of the vehicle body, as a result, it is possible to provide a convenience in mounting the radar sensor to the vehicle while improving the appearance of the vehicle.

A radar apparatus or a radar system according to the present embodiment may include at least one of a front detection radar sensor mounted on the front of the vehicle, a rear detection radar sensor mounted on the rear of the vehicle, and a side detection radar sensor mounted on respective side of the vehicle.

The radar apparatus or radar system according to the present embodiment may include an electronic control unit (ECU) or a processor for analyzing the transmission and reception signals and processing the data and thereby for acquiring information of the target. In addition, a communication link including an appropriate vehicle network bus such as a CAN may be utilized for the data transmission or signal communication between the radar sensor device and the ECU.

In this disclosure, the horizontal information may be used with the same meaning as the azimuth information or azimuth angle, and the vertical information may be used with the same meaning as the elevation information or the elevation angle.

An example of a method of obtaining elevation/azimuth information of an object, using the radar apparatus 100 according to an embodiment of the present disclosure is described hereafter.

Figure 7:
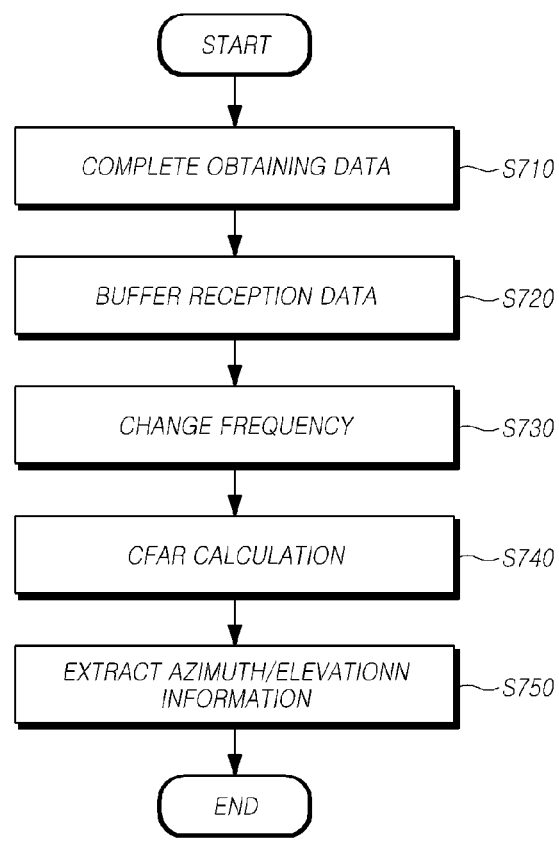
FIG. 7 is a flowchart illustrating a signal processing method provided by the radar apparatus according to an embodiment of the present disclosure; and, FIG. 8 shows differences in a signal waveform and a frequency band in a mid/long-range detection mode and a short-detection mode in a radar apparatus according to an embodiment of the present disclosure.

FIG. 7 is a flowchart illustrating a signal processing method provided by the radar apparatus according to an embodiment of the present disclosure.

FIG. 7 is a flowchart showing signal processing after signals are received by the signal transmission/reception method described above with reference to FIGS. 4 to 6.

The reception data obtained in step S710 may be data-buffered in a unit sample size being processable in one cycle (S720), and then frequency conversion (S730) is performed Thereafter, the method performs CFAR (Constant False Alarm Rate) calculation on the basis of the frequency-changed reception data (S740) and extract elevation/azimuth information, speed information, and distance information of a target (S750). The frequency change in step S730 may use Fourier transform such as FFT (Fast Fourier Transform).

Figure 8:
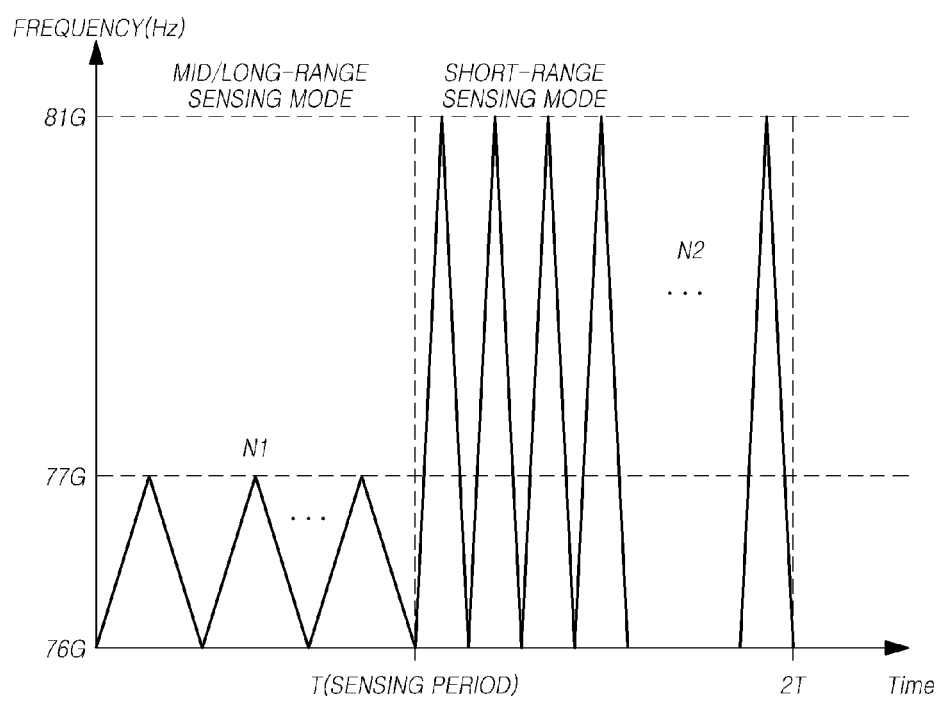

FIG. 8 shows differences in a signal waveform and a frequency band in a mid/long range detection mode and a short range detection mode in a radar apparatus according to an embodiment of the present disclosure.

As in FIGS. 4 and 6, using the radar apparatus according to this embodiment makes it possible to precisely measure azimuth information of an object in both a mid/long-range detection mode and a short-range detection mode.

In addition to this configuration, the radar apparatus according to this embodiment may improve sensing performance by using frequency bands and signal waveforms that are different in the mid/long-range detection mode and the short-range detection mode, which is described in detail hereafter.

In general, radar apparatus may have a wide frequency band for transmission signals, large output, and resolving power or signal sensing performance that is improved as the number of waveforms output in one sensing period is increased.

However, the available frequency bands of automotive radars are limited to avoid interference with other vehicles or other electronic waves in a mid/long-range detection mode. That is, the automotive radars can use wide frequency band in a short-range detection mode because there is a low possibility of interference with other radar apparatuses, but available frequency bands are limited in many cases in a mid/long-range detection mode to avoid interference.

Accordingly, in the radar apparatus according to this embodiment, a first transmission signal in the mid/long-range detection mode shown in FIG. 4 uses a first frequency band and have a first number signal waveforms (Chirp) that are relatively fewer in one sensing period T, and as second transmission signal in the short-range detection mode uses a second frequency band higher than the first frequency band and have a second number of signal waveforms larger than the first number in one sensing period.

Further, output of transmission signals can be larger in the mid/long-range detection mode than the short-range detection mode.

That is, as shown in FIG. 8, so-called slow chirp transmission signals that are generated in the first frequency band of about 76~77 GHz and have a large waveform width are used in the mid/long-range detection mode.

On other hand, so-called fast chirp transmission signals that are generated in the second frequency band of about 76~81 GHz higher than the first frequency band and have a small width of waveform are used in the short-range detection mode.

Accordingly, the first number N1 of waveforms (Chirp) included in one sensing period T or cycle in the mid/long-range detection mode is smaller than the second number N1 of waveforms included in the one sensing period in the short-range detection mode.

Meanwhile, the first frequency band and the second frequency band may overlap each other or may be completely different frequency bands.

In general, the fast chirp type that outputs a plurality of waveforms for one sensing cycle has high sensing performance instead of an increase in data and particularly it can secure desired resolution from low output.

Therefore, as in this embodiment, since slow chirp transmission signals having large output and generated in a low frequency band are used in the mid/long-range detection mode, it is possible to avoid interference with other radar apparatuses etc. and secure needed sensing performance.

Further, since fast chirp transmission signals in a wider frequency band are used in the short-range detection mode, it is possible to secure needed resolving power from even low output.

As described above, the radar apparatus of this embodiment includes the antenna systems shown in FIG. 3, and in order to obtain azimuth/elevation information of an object, uses the signal transmission/reception methods shown in FIGS. 4 to 6 and makes frequency bands and signal waveforms of transmission signals different in a short-range detection mode and a mid/long-range detection mode, thereby being able to avoid interference with other radar apparatuses and measure azimuth/elevation information of an object with high resolution at both a mid/long distance and a short distance.

According to the embodiments according to the present disclosure described above, two transmission antennas disposed on both sides of the transmission antenna set may be arranged apart from each other by a predetermined vertical distance in a first direction perpendicular to the ground, and the four receiving antennas may be disposed apart from each other by a predetermined horizontal distance, so that the vertical information and the horizontal information of the object can be easily obtained in the long range detection mode and the short range detection mode.

In addition, in the above-described antenna structure, the transmission antennas for transmitting the transmission signals is differently selected in the long range detection mode and the short range detection mode, thereby the vertical information and the horizontal information of the object can be obtained in the long range detection mode and the short range detection mode.

According the antenna apparatus and the radar apparatus of the present disclosure, the shapes of the frequency band and the signal waveform of the transmission signal may be different from each other in the long range detection mode and the short range detection mode, so that the measurement resolution of the horizontal/vertical information of the object may be improved in both long range detection mode and the short range detection mode, and an interference with other radar devices may be prevented.

As a result, it is possible to achieve the performance of precisely measuring elevation and azimuth information of an object in both of a mid/long-range detection mode and a short-range detection mode, which is required for automotive radars, without physically changing the radar apparatus or adding other apparatuses.

Further, since the frequency bands and waveforms of transmission signals are made different in the short-range detection mode and the mid/long-range detection mode, it is possible to avoid interference with other radar apparatuses and improve resolution in measuring azimuth/elevation information of an object at both of a mid/long distance and a short distance.

Even though all components of embodiments of the present disclosure were described as being combined in a single part or being operated in cooperation with each other, the present disclosure is not limited thereto. That is, all the components may be selectively combined one or more parts and operated if it is within the object of the present disclosure. Further, all of the components may be implemented by single independent hardware, respectively, but some or all of the components may be selectively combined and implemented by computer programs having a program module that performs some or all of functions combined by one or more pieces of hardware. Codes or code segments constituting the computer programs may be easily inferred by those skilled in the art. The computer programs are stored in computer-readable media and read and executed by a computer, whereby embodiments of the present disclosure can be achieved. A magnetic storing medium, an optical recording medium, and a carrier wave medium may be included in the recording media of computer programs.

Further, terms 'include', 'constitute', 'have' etc. stated herein means that corresponding components may be included, unless specifically stated, so they should be construed as being able to further include other components rather than excepting other components. Unless defined otherwise, all the terms used in the specification including technical and scientific terms have the same meaning as those that are understood by those skilled in the art. The terms generally used such as those defined in dictionaries should be construed as being the dame as the meanings in the context of the related art and should not be construed as being ideal or excessively formal meanings, unless defined in the present disclosure.

The above description is an example that explains the spirit of the present disclosure and may be changed and modified in various ways without departing from the basic features of the present disclosure by those skilled in the art. Accordingly, the embodiment described herein are provided not to limit, but to explain the spirit of the present disclosure and the spirit and the scope of the present disclosure are not limited by the embodiments. The protective range of the present disclosure should be construed on the basis of claims and all the technical spirits in the equivalent range should be construed as being included in the scope of the right of the present disclosure.

What is claimed is:

1. A radar apparatus, comprising:
    an antenna member configured to include a transmission antenna set including at least one first transmission antenna and a second transmission antenna spaced apart from the first transmission antenna by a first vertical distance in a first direction perpendicular to a ground and a receiving antenna set including at least one receiving antenna disposed at the same vertical position as the first transmission antenna or the second transmission antenna;
    a transceiver configured to transmit a transmission signal by using at least one of the transmission antenna in a first detection mode or a second detection mode and to receive a reflection signal by using all of the receiving antennas; and
    a processer configured to process the reflection signal received from the receiving antenna and to acquire at least one of a horizontal information or a vertical information of an object,
    wherein the first transmission antenna comprises a first-1 transmission antenna including 4 or 6 array antennas and a first-2 transmission antenna including two array antennas, and
    the second transmission antenna comprises 4 or 6 array antennas.

2. The radar apparatus of claim 1, wherein the receiving antenna set comprises a first receiving antenna, a second receiving antenna, a third receiving antenna and a fourth receiving antenna which are sequentially spaced apart from each other in a second direction perpendicular to the first direction,
    wherein the first receiving antenna and fourth receiving antenna are spaced apart from a midpoint between the second receiving antenna and the third receiving antenna by a first horizontal distance respectively.

3. The radar apparatus of claim 2, wherein the first-1 transmission antenna and the second transmission antenna are spaced apart from each other by a second horizontal distance corresponding to twice the first horizontal distance in the second direction.

4. The radar apparatus of claim 3, wherein the first-2 transmission antenna is disposed between the first-1 transmission antenna and the second transmission antenna.

5. The radar apparatus of claim 4, wherein each of the first receiving antenna and the fourth receiving antenna includes two array antennas and each of the second receiving antenna and the third receiving antenna includes one array antenna, and
    the processor synthesizes the signals received from the second receiving antenna and the third receiving antenna such that the signals are used as one receiving channel.

6. The radar apparatus of claim 5, wherein the second receiving antenna and the third receiving antenna are arranged to be spaced apart from each other by a half of the wavelength of the transmission signal in the second direction.

7. The radar apparatus of claim 2, wherein the first detection mode is a mid range detection mode or a long range detection mode, and
    wherein the transceiver transmits code-divided transmission signals from the first-1 transmission antenna and the second transmission antenna in the first detection mode and receives reflection signals at all of the receiving antennas in order to obtain the horizontal information of the object.

8. The radar apparatus of claim 7, wherein the second detection mode is a short range detection mode, and
    wherein the transceiver transmits a transmission signal from the first-2 transmission antenna in the second detection mode and receives reflection signals at all of the receiving antennas.

9. The radar apparatus of claim 8, wherein, in order to acquire the vertical information of the object, the transceiver transmits code-divided transmission signals from the first-1 transmission antenna and the second transmission antenna and receives reflection signals at all of the receiving antennas.

10. The radar apparatus of claim 9, wherein a frequency band and a signal waveform of the code-divided transmission signal in the long range detection mode are different from a frequency band and a signal waveform of the transmission signal in the short range detection mode.

11. The radar apparatus of claim 2, wherein a horizontal distance between the second receiving antenna and the third receiving antenna is set to a half (0.5λ) of a wavelength of the transmission signal, which is different than the first horizontal distance.

12. An antenna apparatus for a radar apparatus, the antenna apparatus comprising:
a transmission antenna set including at least one first transmission antenna and a second transmission antenna spaced apart from the first transmission antenna by a first vertical distance in a first direction perpendicular to a ground; and
a receiving antenna set including four receiving antennas disposed at the same vertical position as the first transmission antenna or the second transmission antenna and spaced apart from each other by a predetermined horizontal distance in a horizontal direction perpendicular to the first direction,
wherein the first transmission antenna comprises a first-1 transmission antenna including 4 or 6 array antennas and a first-2 transmission antenna including two array antennas, and the second transmission antenna comprises 4 or 6 array antennas.

13. The antenna apparatus of claim 12, wherein the receiving antenna set comprises a first receiving antenna, a second receiving antenna, a third receiving antenna and a fourth receiving antenna which are sequentially spaced apart from each other in a second direction perpendicular to the first direction,
wherein the first receiving antenna and fourth receiving antenna are spaced apart from a midpoint between the second receiving antenna and the third receiving antenna by a first horizontal distance respectively.

14. The antenna apparatus of claim 13,
wherein the first-1 transmission antenna and the second transmission antenna are spaced apart from each other by a second horizontal distance corresponding to twice the first horizontal distance in the second direction perpendicular to the first direction.

15. The antenna apparatus of claim 14, wherein the first-2 transmission antenna is disposed between the first-1 transmission antenna and the second transmission antenna.

16. The antenna apparatus of claim 14, wherein each of the first receiving antenna and the fourth receiving antenna includes two array antennas and each of the second receiving antenna and the third receiving antenna includes one array antenna, and
the second receiving antenna and the third receiving antenna are synthesized and used as one receiving channel.

17. The antenna apparatus of claim 16, wherein the second receiving antenna and the third receiving antenna are arranged to be spaced apart from each other by a half of the wavelength of the transmission signal in the second direction.

18. A radar apparatus, comprising:
an antenna member configured to include a transmission antenna set including at least one first transmission antenna and a second transmission antenna spaced apart from the first transmission antenna by a first vertical distance in a first direction perpendicular to a ground and a receiving antenna set including at least one receiving antenna disposed at the same vertical position as the first transmission antenna or the second transmission antenna;
a transceiver configured to transmit a transmission signal by using at least one of the transmission antenna in a first detection mode or a second detection mode and to receive a reflection signal by using all of the receiving antennas; and
a processor configured to process the reflection signal received from the receiving antenna and to acquire at least one of a horizontal information or a vertical information of an object,
wherein the first transmission antenna comprises a first-1 transmission antenna and a first-2 transmission antenna,
wherein the receiving antenna set comprises four receiving antennas, and
wherein a horizontal distance between the first-1 transmission antenna and the second transmission antenna in a second direction perpendicular to the first direction is set to a same distance as a horizontal distance between two receiving antennas disposed at the outermost of the four receiving antennas constituting the receiving antenna set in the second direction.

* * * * *